F. COLETTA.
AUTOMOBILE BUMPER AND WHEEL FENDER.
APPLICATION FILED NOV. 12, 1921.
1,407,637. Patented Feb. 21, 1922.
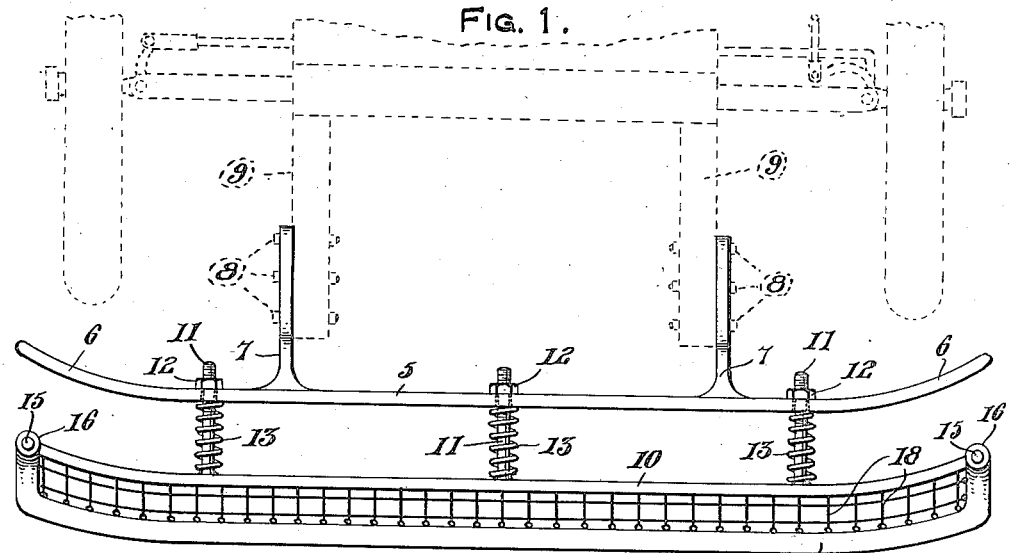
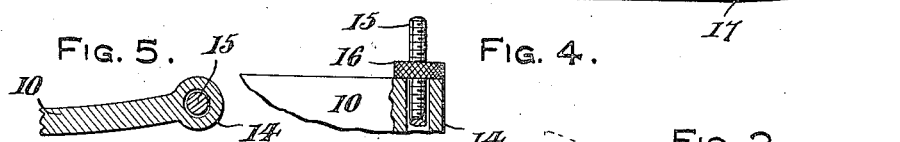
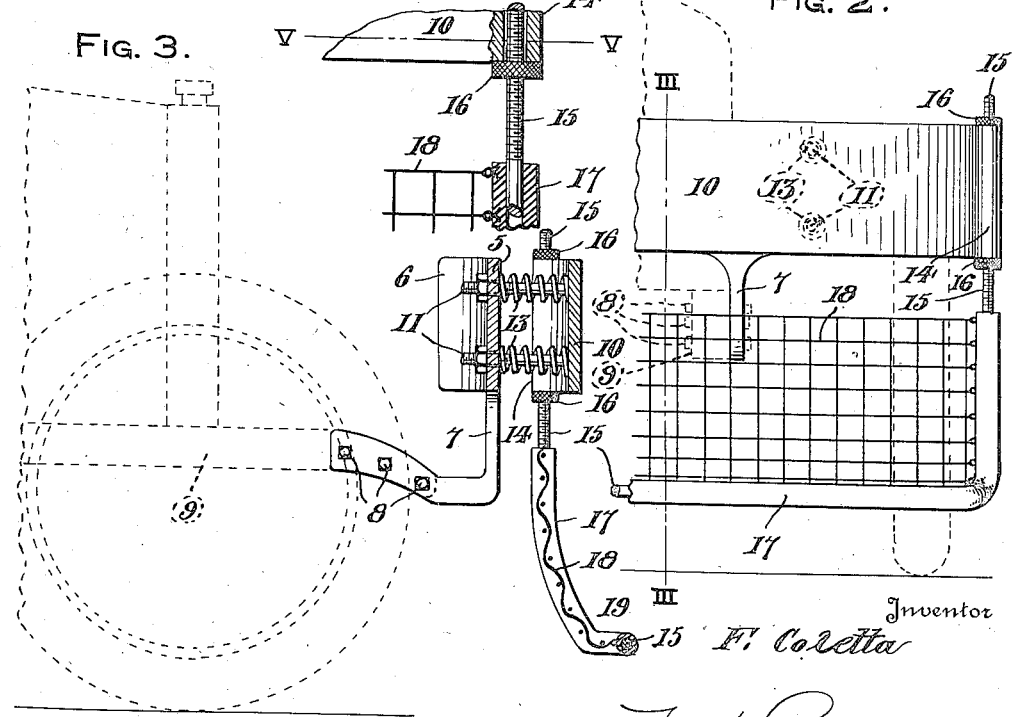
Inventor
F. Coletta
By F. K. Bryant.
Attorney

UNITED STATES PATENT OFFICE.

FRANCES COLETTA, OF WILMINGTON, DELAWARE.

AUTOMOBILE BUMPER AND WHEEL FENDER.

1,407,637.        Specification of Letters Patent.     Patented Feb. 21, 1922.

Application filed November 12, 1921. Serial No. 514,775.

*To all whom it may concern:*

Be it known that I, FRANCES COLETTA, a citizen of the United States of America, residing at Wilmington, in the county of New Castle and State of Delaware, have invented certain new and useful Improvements in Automobile Bumpers and Wheel Fenders, of which the following is a specification.

This invention relates to certain new and useful improvements in automobile bumpers and wheel fenders particularly designed to receive and absorb shocks from collisions or the like as well as to prevent persons from passing under the wheels of an automobile to safeguard against loss of life to a maximum extent.

The primary object of the invention is to generally simplify and improve automobile bumpers and wheel fenders.

Another object of the invention is to provide an extremely simple and efficient form of resilient vehicle bumper having novel means for supporting a depending wheel fender whereby a practical and compact device is presented which is devoid of an unsightly appearance.

With the above general objects in view and others that will appear as the nature of the invention is better understood, the same consists in the novel form, combination and arrangement of parts hereinafter more fully described in connection with the accompanying drawing and in which like characters of reference indicate similar parts throughout the views.

In the drawing,

Figure 1 is a top plan view of a combined bumper and wheel fender constructed in accordance with the present invention and shown operatively associated with the forward end of an automobile which is indicated in outline by dotted lines, Figure 2 is a fragmentary front elevational view of one of the devices shown in Figure 1, Figure 3 is a vertical sectional view taken substantially upon line III—III of Figure 2, Figure 4 is a fragmentary view partly in vertical section and partly in elevation of a corner portion of the device shown in Figure 1, and Figure 5 is a horizontal sectional view taken upon line V—V of Figure 4.

Referring more in detail to the several views, the present invention embodies a horizontally disposed backing plate 5 of sufficient length to extend entirely across the front of a motor vehicle so that the ends of the same lie in front of the wheels of the latter and are preferably curved toward the wheels as at 6, said plate 5 being rigidly supported at the proper elevation by means of suitable bracket arms 7 which are rigid with and preferably integral with the plate 5 in position to be suitably bolted as at 8 to the adjacent ends of the side rails 9 of the chassis, said bracket arms 7 being preferably extended downwardly from the lower edge of the plate 5 and then rearwardly as shown clearly in Figure 3.

Another plate 10 substantially the same in general form and size as the plate 5 is disposed forwardly of the latter and in spaced relation thereto, said plate 10 comprising a yieldable bumper plate slidably connected to the plate 5 by means of a plurality of bolts 11 which are preferably rigid with the plate 10 and freely disposed through openings provided in the plate 5. Nuts 12 are threaded upon the ends of the bolts 11 inwardly of the plate 5 so as to limit the outward movement of the plate 10 relative to the plate 5 under the action of the helical compression springs 13 which are disposed upon the bolts 11 between the plates 5 and 10. It will thus be seen that the plate 10 will receive the impact of a collision which will be cushioned by the spring 13.

The ends of the plate 10 are formed with rigid vertical tubes 14 through which the vertical legs of a U-shaped wheel fender frame 15 are slidably extended, the upper ends of the legs of this frame being screw threaded as shown clearly in Figures 2, 3, and 4 and having nuts screwed thereon as at 16 in position to engage the upper and lower ends of the tubes 14 whereby the frame is effectively held in any desired adjustment relative to the ground, the preferable adjustment being such as to allow a slight space between the lower end of the frame and the ground as shown in Figures 2 and 3.

The frame 15 is provided with a net or screen construction preferably including a U-shaped rubber tube 17 enclosing the horizontal lower or intermediate portion of the frame and the lower portions of the legs of said frame and constituting a rim for a screen 18 of wire mesh or the like. In the preferred construction and as clearly shown in Figures 1 and 3, the wheel fender including the U-shaped frame 15 is outturned as at 19 at its lower end as is common in devices of this general kind for an obvious purpose.

In operation, should the plate 10 come in contact with an obstruction or collide with a moving vehicle or the like, said plate will be forced rearwardly toward the plate 5 against the action of the springs 13, at which time the bolts 11 slide through said plate 5. As soon as the force is released from the plate 10, the latter will be immediately returned to its normal position by said springs 13 and it will be evident that the springs 13 will offer sufficient cushion to greatly reduce the shock of a collision and by reason of the relatively strong nature of the plates 5 and 10, considerable damage to the automobile proper will be prevented.

Should a person be caught in the path of the vehicle equipped with the present device, the fender will catch said person and drag him along until the vehicle can be brought to a stop so that the person is thereby prevented from being run over by the wheels of the vehicle, a cause for much injury to pedestrians from occurrences of this kind.

From the foregoing description, it is believed that the construction and operation of the present invention will be readily understood and appreciated by those skilled in the art as well as the advantages thereof.

Minor changes may be made without departing from the spirit and scope of the invention as claimed.

What is claimed as new is:

1. A bumper for motor vehicles comprising a plate provided with rigid arms extending downwardly and rearwardly from the lower edge thereof and adapted to have their rearwardly extending portions rigidly attached to the ends of the side rails of an automobile chassis for supporting the plate in a horizontal position with the ends of the plate disposed in front of the adjacent wheels of said vehicle, and a second plate yieldingly maintained in spaced relation to and in front of the first named plate, the second named plate being supported by the first named plate and adapted to receive the impact of collisions.

2. A bumper for motor vehicles comprising a plate provided with rigid arms extending downwardly and rearwardly from the lower edge thereof and adapted to have their rearwardly extending portions rigidly attached to the ends of the side rails of an automobile chassis for supporting the plate in a horizontal position with the ends of the plate disposed in front of the adjacent wheels of said vehicle, and a second plate yieldingly maintained in spaced relation to and in front of the first named plate, the second named plate being supported by the first named plate and adapted to receive the impact of collisions, the means for supporting the second named plate from the first named plate comprising bolts rigidly carried by the second named plate and slidably disposed through the first named plate and the means for yieldingly holding the plates spaced comprising compression springs disposed between the plates and surrounding said bolts.

3. A bumper for motor vehicles comprising a plate provided with rigid arms extending downwardly and rearwardly from the lower edge thereof and adapted to have their rearwardly extending portions rigidly attached to the ends of the side rails of an automobile chassis for supporting the plate in a horizontal position with the ends of the plate disposed in front of the adjacent wheels of said vehicle, and a second plate yieldingly maintained in spaced relation to and in front of the first named plate, the second named plate being supported by the first named plate and adapted to receive the impact of collisions, the means for supporting the second named plate from the first named plate comprising bolts rigidly carried by the second named plate and slidably disposed through the first named plate and the means for yieldingly holding the plates spaced comprising compression springs disposed between the plates and surrounding said bolts, and nuts threaded upon the bolts to engage the inner surface of the first named plate for limiting the outward movement of the bolts and the separation of the second named plate from the first named plate.

4. In combination with a spring pressed bumper of an automobile including a yieldably mounted horizontal impact receiving plate provided with vertical end tubes rigid therewith, a vertically adjustable wheel fender supported by said plate and including a U-shaped frame with legs vertically slidable through said tubes, and means to secure the frame rigid with the plate at any desired elevation above the ground.

5. In combination with a spring pressed bumper of an automobile including a yieldably mounted horizontal impact receiving plate provided with vertical end tubes rigid therewith, a vertically adjustable wheel fender supported by said plate and including a U-shaped frame with legs vertically slidable through said tubes, and means to secure the frame rigid with the plate at any desired elevation above the ground, the upper ends of the legs of the fender frame being screw threaded, and said last named means including nuts threaded upon the legs of the fender frame at opposite ends of said tubes.

In testimony whereof I affix my signature,

FRANCES COLETTA,